United States Patent
Karani et al.

(10) Patent No.: US 10,037,489 B2
(45) Date of Patent: Jul. 31, 2018

(54) METHODS AND APPARATUS FOR AUTOMATIC IDENTIFICATION WRISTBAND

(71) Applicant: QUAKE GLOBAL, INC., San Diego, CA (US)

(72) Inventors: Chetan Shantilal Karani, Chantilly, VA (US); Alexander Lee O'Bruba, Ashburn, CA (US)

(73) Assignee: Quake Global Inc., San Diego, CA (US)

( * ) Notice: Subject to any disclaimer, the term of this patent is extended or adjusted under 35 U.S.C. 154(b) by 0 days.

(21) Appl. No.: 15/425,742

(22) Filed: Feb. 6, 2017

(65) Prior Publication Data

US 2017/0147918 A1    May 25, 2017

Related U.S. Application Data

(63) Continuation of application No. 14/770,802, filed as application No. PCT/US2014/018650 on Feb. 26, 2014, now Pat. No. 9,563,835.

(60) Provisional application No. 61/769,442, filed on Feb. 26, 2013.

(51) Int. Cl.
```
G06K 19/06     (2006.01)
G06K 19/077    (2006.01)
G06K 19/07     (2006.01)
G06F 17/30     (2006.01)
```

(52) U.S. Cl.
CPC . *G06K 19/07762* (2013.01); *G06F 17/30879* (2013.01); *G06K 19/0702* (2013.01); *G06K 19/0717* (2013.01); *G06K 19/07775* (2013.01)

(58) Field of Classification Search
CPC ............ G06K 19/07749; G07F 7/1008; G06Q 20/341
USPC .................................................. 235/492, 451
See application file for complete search history.

(56) References Cited

U.S. PATENT DOCUMENTS

| | | | |
|---|---|---|---|
| 6,836,215 B1 | 12/2004 | Laurash et al. | |
| 7,240,446 B2 | 7/2007 | Bekker | |
| 7,562,445 B2 | 7/2009 | Lerch et al. | |
| 7,658,026 B2 * | 2/2010 | Jain | G09F 3/005 40/6 |
| 7,743,540 B2 * | 6/2010 | McDermott | G09F 3/005 224/604 |

(Continued)

OTHER PUBLICATIONS

International Search Report and Written Opinion received in PCT International application No. PCT/US2014/018650, dated Jun. 11, 2014, 10 pages.

*Primary Examiner* — Ahshik Kim
(74) *Attorney, Agent, or Firm* — Jonathan Cheng (57) ABSTRACT

An apparatus for automatic radio-frequency identification (RFID). In an embodiment, the apparatus comprises a flexible strap comprising a plurality of holes and a buckle configured to buckle to any one of the plurality of holes, such that, when the buckle is buckled to one of the plurality of holes, the strap forms a closed loop. The apparatus further comprises one or more tag enclosures. Each tag enclosure comprises one or more buckles and a RFID tag configured to communicate identifying data to a reader device. The one or more buckles of each tag enclosure are each configured to buckle to any one of the plurality of holes on the strap such that the tag enclosure may be attached to the strap at any one of a plurality of positions on the strap.

20 Claims, 6 Drawing Sheets

(56) References Cited

U.S. PATENT DOCUMENTS

| | | | |
|---|---|---|---|
| 8,225,540 B2 * | 7/2012 | Shigaraki | G09F 3/005 40/633 |
| 8,296,982 B2 * | 10/2012 | Bekker | G09F 3/005 40/633 |
| 2005/0108912 A1 | 5/2005 | Bekker | |
| 2006/0250249 A1 | 11/2006 | Cheng | |
| 2007/0024425 A1 | 2/2007 | Nitzan et al. | |
| 2007/0046369 A1 | 3/2007 | Schober et al. | |
| 2009/0045916 A1 | 2/2009 | Nitzan et al. | |
| 2011/0226861 A1 | 9/2011 | Warther | |
| 2011/0266343 A1 | 11/2011 | Liu | |

* cited by examiner

FIG. 6

METHODS AND APPARATUS FOR AUTOMATIC IDENTIFICATION WRISTBAND

CROSS-REFERENCE TO RELATED APPLICATIONS

This application is a continuation of U.S. patent application Ser. No. 14/770,802, filed Aug. 26, 2015, which is the U.S. national stage of International Patent App. No. PCT/US2014/018650, filed Feb. 26, 2014, which claims priority to U.S. Provisional Patent App. No. 61/769,442, filed on Feb. 26, 2013, each of which is incorporated herein by reference in its entirety.

This application is related to U.S. patent application Ser. No. 13/199,289 ("the '289 application"), filed on Aug. 25, 2011 and entitled "UHF RFID Wristband with a Long Read Range," which claims priority to U.S. Provisional Patent App. No. 61/379,172, filed on Sep. 1, 2010 and entitled "UHF RFID Wristband with a Long Read Range," each of which is incorporated herein by reference in its entirety.

BACKGROUND

Field of the Invention

Embodiments described herein relate generally to wristbands for automatic identification and tracking, and, in particular, to a multipurpose wristband apparatus that can incorporate any type or combination of types of automatic identification technology such as barcode, passive radio-frequency identification (RFID), battery-assisted passive (BAP) RFID, and/or active RFID.

Description of the Related Art

The technique of identifying objects using radio-frequency communications has been eponymously called radio-frequency identification (RFID). RFID systems have been employed in an increasingly wide range of applications such as retail supply chain, postal logistics, healthcare, manufacturing, retail stores, airport baggage tracking, hospitality, social media, travel, theme parks, etc. In retail supply chain applications, RFID has been used to track and trace goods throughout the supply chain, automate the receipt of pallets of shipments at distribution centers, increase shipping accuracy of goods from distribution centers (DCs) to stores, and manage inventory throughout the supply chain. In postal logistics RFID has been used to monitor the quality of service of postal shipments for international and national mail systems. For instance, a global postal organization has deployed RFID to over forty countries around the world (and increasing) to measure and monitor quality of service of mail delivered between those countries. In healthcare, RFID is being used for asset and resource management, as well as patient and staff tracking for improving patient flow within hospitals. In airports, specifically baggage tracking, RFID is being used as a replacement to barcode-based systems for quicker, more secure, and more accurate transfer of bags to improve the overall baggage handling rate.

Accordingly, RFID systems have been increasingly employed in diverse applications to facilitate the identification and tracking of merchandise, personnel, and other items and/or individuals that need to be reliably monitored and/or controlled within a particular environment. The introduction of RFID into these applications has resulted in more secure, efficient, and accurate systems.

A conventional RFID system typically includes at least one RFID transponder or "tag," at least one RFID reader (or interchangeably referred to as an "interrogator"), and at least one controller or server. The reader inventories the tags and forwards the data to the server or controller.

At the physical layer of a passive ultra-high-frequency (UHF) RFID system, RFID tags communicate by "backscattering" signals that are concurrent with reader transmissions, and using a variety of frequencies and encodings under the control of the reader. This is in contrast to earlier high-frequency (HF) tags based on inductive coupling that only provided read ranges of centimeters, and active tags that require batteries to increase their range. There is a class of tags called battery-assisted-passive (BAP) that may also be of interest. For some applications, more range or link margin may be needed than a passive tag, especially in environments with metals and water in which electromagnetic waves experience shadowing of energy, destructive interference, or strong attenuation. More link margin may lead to better reading reliability and better interference control in harsh environments. BAP tags may overcome the read sensitivity limitation of passive tags by adding a battery to power the chip. The radio-frequency (RF) signal is then only used to carry the information, not to supply power to the chip. These tags retain the reverse link of passive tags, i.e., backscatter the response. BAP tags fill the gap between purely passive tags and the more costly (battery-powered) active tags.

Each RFID reader typically follows a predefined sequence or protocol to interrogate and retrieve data from one or more RFID tags within the RF field of the reader (also known as the "interrogation zone" of the reader). It is noted that the interrogation zone of a reader is generally determined by the physical positioning and orientation of the reader relative to the tags, and the setting of various parameters (e.g., the transmit power) employed by the reader during the interrogation sequence.

In systems employing passive tags, the interrogation zone is typically defined by the power coupling zone. For example, a typical interrogation sequence performed by a RFID reader includes transmitting a continuous wave (CW) to one or more passive tags within the reader's interrogation zone to power the tags, and transmitting a message packet (e.g., a request or command) by modulating the carrier signal. The passive tag then reads the message packet while tapping some of the energy of the CW to maintain its power. The message packet typically identifies one or a subset of the tags within the interrogation zone as the designated target of the message packet, and provides a request or command that the designated tag is expected to perform. After the passive tag reads the information carried by the modulated carrier signal, the tag appropriately modulates the CW, and reflects a portion of the modulated wave back to the reader by changing the reflection characteristics of its antenna via a technique known as "backscatter modulation."

The physical and logical layers of the communication between the Reader and the tag are defined by the air protocol. Specifically, the air protocol defines the signaling layer of the communication link, the reader and tag operating procedures and commands, and the collision arbitration (also known as "singulation") scheme to identify a specific tag in a multiple-tag environment. The world-wide standard air protocol in the UHF band is currently the EPCGlobal Class-1 Generation 2 (ISO 18000-6c) protocol ("Gen2 protocol"). Embodiments disclosed herein may use—but are not limited to using—the Gen2 protocol for communications between the reader and tags.

The collision arbitration (i.e., singulation) algorithm used in the Gen2 protocol is called the "Q algorithm" and is a variant of the slotted Aloha protocol. At the beginning of a round, the reader broadcasts the round size S to all the tags in its field of view. Each tag, upon receipt of this initial message, generates a pseudo-random number between 1 and S. That becomes the target time-slot in which the tag responds. The reader is the time-keeper and advances time by sending slot messages to the tags. Each tag decrements its target slot counter, and when the counter hits zero, the tag responds to the reader. At the reader receive side, the reader listens for a tag response in each slot. If exactly one tag responds, it initiates a state machine to transact with the tag. In the case of a collision or an "empty" slot, the reader either decides to resize S and start a new round or proceeds with the current round. This is how a single RFID reader is able to identify multiple tags in a rapid manner. For example, the singulation rate in a dense reader environment is roughly two-hundred tags per second.

The communication protocol used between the reader and the controller or server is called a reader protocol. The EPCGlobal Low Level Reader Protocol (LLRP) is currently the standard reader protocol that is employed by most conventional readers around the world. Embodiments disclosed herein may use—but are not limited to using—the LLRP protocol for communications between the reader and controller or server.

UHF RFID readers operate in the industrial, scientific, and medical (ISM) band and are prone to external interference from cordless telephones, wireless headsets, wireless data networks, etc. In addition, there may be interference due to other co-located readers. Each reader's RF receiver front end must be designed to withstand high-interference signal levels without introducing distortion that can cause tag response decoding errors. The receiver noise needs to be low so that it has sufficient dynamic range (transmit power-received tignal power from the tag) to allow error-free detection of low-level responding tag signals.

A forward-link-limited system may be limited by the receive sensitivity of the tag, and hence, beyond a certain distance, there may not be enough RF energy incident on the tag to energize it and then subsequently backscatter its response. On the other hand, a reverse-link-limited system may be limited by the receive sensitivity of the reader, and hence, beyond a certain distance between the tag and the reader, the reader may not be able to decode the tag responses correctly. Passive UHF RFID systems are typically forward-link-limited. This is because the state-of-the-art reader manufacturers have done a very good job at designing in sufficiently high dynamic range such that a reader is never backscatter-limited for passive UHF tags. The dynamic range of the state of the art UHF reader is about 120 dBm and improving. A 120 dBm dynamic range gives a RF link budget of 60 dBm each way. Thus, starting at a transmit power 30 dB with a 6 dB gain, and the forward-link budget of 60 dBm, the limiting receive signal strength at the tag is −24 dB, which is much lower than the receive sensitivity of the best tag available in the marketplace of −18 dBm. Notably, the FCC limits maximum radiated energy—the combination of transmit power at a reader port (which can be more than 30 dB to compensate for insertion loss) and antenna gain—at 4 watts EIRP (equivalent isotropically radiated power). Thus, the bottleneck with conventional UHF readers and passive tags is the forward link to the tag.

However, if a battery assisted passive (BAP) tag is used, a different result may occur. The receive sensitivity of the state of the art BAP tag is −30 dBm. This means that even at the limit (or the reader's dynamic range) and beyond it, the BAP tag can be powered and respond to the reader's signal. This means that the system becomes reverse-link-limited when interrogating BAP tags. This places stress on the design and implementation of the reader's receive path.

Certain behavior characteristics of electromagnetic fields may dominate at one distance from a radiating antenna, while a completely different behavior may dominate at another distance. At UHF frequencies, tags primarily use electromagnetic coupling in the far field, which means that the readers couple with the tags primarily with propagating electromagnetic energy in the far field (e.g., distance greater than two wavelengths). However, when the tag is in the near field (e.g., distance less than one wavelength) of the reader antenna, coupling occurs using inductive coupling. One may design tags to couple with a reader antenna primarily using inductive coupling, giving rise to UHF near-field tags. Embodiments disclosed herein may use—but are not limiting to using—UHF far-field tags.

A tag inlay may comprise a substrate, an antenna, and an integrated chip (IC). The inlay may be incorporated into a label (optionally printable) with pressure-sensitive adhesive or encapsulated in some other way.

The focus of UHF passive tags has been low cost designs. This has led to very simple antenna designs, primarily strip-line dipoles. Antennas are commonly made of aluminum, copper, silver ink, or other low-cost materials. The power transfer efficiency is the measure of the impedance mismatch between the antenna ($R_A+jZ_A$) and the IC($R_{chip}+jZ_{chip}$) and is given by $\tau=(4R_{\downarrow chip}R_{\downarrow A})/(|Z_{\downarrow chip}+Z_{\downarrow A}|)\uparrow 2$. Antennas are typically designed to maximize the power delivered to the IC, and this typically happens only if antenna impedance is the complex conjugate of the IC impedance (also referred to as "impedance matching").

Conventional tag designs are typically passive RFID tags, meant for general purpose supply-chain use cases, specifically designed for free space. The performance of such tags may degrade when placed near high dielectrics such as water. The dielectric constant of water is eighty. This loss of performance may result because the close proximity to high dielectric material may cause a substantial shift in resonant frequency of the antenna causing it to not operate at a resonant mode, hence losing antenna efficiency and also causing a shift in antenna impedance which may negatively impact the power transfer efficiency.

The human body is 60% water. Thus, when a tag that is optimized for free space is applied to the human body, the read distances may be severely impacted. For instance, a tag that reads close to six meters in free space may not be readable at distances more than half a meter. Such degraded performance is typically unacceptable for a UHF-RFID-based people-tracking solution at an enterprise scale. This performance is basically equivalent to a proximity HF-based solution which is typically suitable for door-access type applications, but not for general-purpose people tracking in indoor environments (e.g., within buildings) or outdoor environments (e.g., in theme parks, ski areas, etc.). One such application of people tracking in indoor environments is patient tracking in hospitals. Patient tracking typically requires RFID tags to be in a wristband form-factor. One such application for outdoor environments is tracking skiers at a ski resort. The wristband may serve as an access pass or ticket for entry into the ski resort and/or for utilizing or accessing the ski lift or other services available at the resort, so that skiers do not have to remove their gloves in order to present the pass/ticket at an access point.

Conventional wristbands for patient identification are typically either barcode or HF tag based. Both of these technologies may allow for proximity and line-of-sight based reading. However, such limitations may not allow for patient tracking across a hospital. As mentioned above, wristband designs based on UHF passive tags may have severely degraded performance when applied on a patient's wrist.

On the other end of the spectrum, there are wristband designs based on active tags. However, wristbands built using active tags are typically bulky. They also may be very expensive (e.g., at least ten times that of UHF tag based solutions). Due to their high cost, customers conventionally reuse these wristbands. This may introduce a new workflow for the customer to manage with respect to safety, cleanliness, identity management, and battery life management.

SUMMARY

In an embodiment, an apparatus for automatic RFID is disclosed. The apparatus comprises: a flexible strap comprising a plurality of holes and a buckle configured to buckle to any one of the plurality of holes, such that, when the buckle is buckled to one of the plurality of holes, the strap forms a closed loop; and one or more tag enclosures, wherein each of the one or more tag enclosures comprises one or more buckles, wherein each of the one or more buckles is configured to buckle to any one of the plurality of holes on the strap such that the tag enclosure may be attached to the strap at any one of a plurality of positions on the strap, and a RFID tag configured to communicate identifying data to a reader device.

In a further embodiment, each of the one or more tag enclosures comprise two or more buckles, and wherein each of the two or more buckles is configured to buckle to any one of the plurality of holes on the strap.

In a further embodiment, the one or more tag enclosures comprise a plurality of tag enclosures. Each of the plurality of tag enclosures may be buckled to one or more of the plurality of holes such that, when the strap is formed in the closed loop, two or more spaces between the plurality of tag enclosures along the strap are substantially equal in length. Additionally or alternatively, the buckle of the strap and each of the one or more buckles of each of the one or more tag enclosures may be further configured to unbuckle from each of the plurality of holes such that the strap may form closed loops of different diameters and each of the one or more tag enclosures may be repositioned on the strap to accommodate the different diameters of the closed loops.

Furthermore, each of the plurality of tag enclosures may comprise a RFID tag of a same type. Alternatively, the plurality of tag enclosures may comprise a first tag enclosure and a second tag enclosure, wherein the first tag enclosure comprises a first RFID tag, wherein the second tag enclosure comprises a second RFID tag, and wherein the first RFID tag is of a different type than the second RFID tag. For instance, the first RFID tag may be an active tag and the second RFID tag may be a passive RFID tag. Alternatively, the first RFID tag may be a pure passive RFID tag and the second RFID tag may be a battery-assisted passive RFID tag.

In a further embodiment, the strap comprises a nonconductive element which separates the strap into two portions that are not conductively connected to each other within the strap and that each contain one or more of the plurality of holes. Furthermore, at least one of the one or more tag enclosures may comprise two or more buckles and a conductive material, such that, when one of the two or more buckles is buckled to a hole in a first one of the two portions of the strap and a different one of the two or more buckles is buckled to a hole in a second one of the two portions of the strap, the two portions of the strap are conductively connected to form a circuit loop. In addition, the apparatus may comprise a power supply, wherein, when the circuit loop is formed, the power supply provides power to the one or more tag enclosures that are buckled to the strap, and wherein, when the circuit loop is not formed, the power supply does not provide power to the one or more tag enclosures that are buckled to the strap. In this embodiment, the one or more tag enclosures that are buckled to the strap may comprise a RFID tag that is configured to: when power is provided to the RFID tag, operate as a battery-assisted passive RFID tag; and, when power is not provided to the RFID tag, operate as a pure passive RFID tag. Furthermore, one or more of the one or more tag enclosures that are buckled to the strap may comprise: a RFID tag configured to receive an instruction from a reader device; and a processor configured to, in response to an instruction received from the reader device, turn off a power supply to the RFID tag. The power supply may comprise a printed battery, a power-generating device, one or more of a kinetic power generator, a solar power generator, and a piezoelectric power generator, or a battery (which may or may not be rechargeable).

In a further embodiment, the strap comprises a surface acoustic wave sensor. The surface acoustic wave sensor may comprise a first interdigital transducer, a second interdigital transducer, a piezoelectric substrate between the first and second interdigital transducers, and a delay line between the first and second interdigital transducers. In addition, the delay line may comprise a coating which changes in at least one characteristic in response to one or more environmental changes. This at least one characteristic may be one or more of a conductivity, mass, and elasticity. In an embodiment, the first interdigital transducer outputs an electrical signal to the second interdigital transducer via the delay line, and wherein the change in at least one characteristic of the coating changes a length of the delay line, such that a delay of the electrical signal output from the first interdigital transducer to the second interdigital transducer is changed. Furthermore, the strap may comprise a processing circuit electrically coupled to the second interdigital transducer and configured to detect the change in the delay of the electrical signal output from the first interdigital transducer to the second interdigital transducer or the change in the at least one characteristic.

In a further embodiment, the apparatus further comprises a sensor tag, wherein the sensor tag comprises: a sensor configured to collect data representing at least one characteristic of a surrounding environment; and an antenna configured to transmit the collected data to a reader device. The at least one characteristic of the surrounding environment may comprise one or more of a temperature, motion, vibration, moisture, chemicals, radiation, etc.

In a further embodiment, the one or more buckles of each of the one or more tag enclosures are further configured to unbuckle from any one of the plurality of holes on the strap to which it is buckled.

In a further embodiment, one or more of the one or more tag enclosures comprise an informational area comprising printed or displayed information that identifies a subject to which the apparatus is attached.

In a further embodiment, the apparatus further comprises one or more ports for receiving one or more connectors for forming one or more physical connections. These one or more physical connections may comprise one or more of a Universal Serial Bus (USB) connection, a serial connection, an Inter-Integrated Circuit (I²C) connection, three-wire connection, and the like.

DETAILED DESCRIPTION

In some embodiments, a wristband can be attached to a subject, such as a human (e.g., a patient, personnel, theme park visitor, prisoner), an animal (e.g., a pet, a bird for scientific study, a tiger in a wild animal park, a research monkey), or an object (e.g., a medical instrument, a mobile communication device, a consumer product), to identify and track that subject. Such a wristband can be equipped with one or multiple identification tags having any type of automatic identification and data capture (AIDC) technologies that enable automatic and real-time data collection, processing, and/or identification. AIDC technologies can include, for example, a one-dimensional barcode (linear barcode), a two-dimensional barcode (matrix barcode), a quick response (QR) barcode, a passive RFID (including low frequency (LF), HF, UHF, microwave, etc.), BAP RFID, active RFID (including LF, UHF, Wi-Fi, Bluetooth®, Zigbee®, ultrasound, infrared, ultra wide band (UWB), etc.), biometrics (e.g., iris and/or facial recognition system), magnetic stripes, optical character recognition (OCR), smart cards, voice recognition, surface acoustic wave (SAW)-based sensor, etc.

As used herein, a module can be, for example, any assembly and/or set of operatively-coupled electrical components associated with performing a specific function, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a rule engine module" is intended to mean a single engine module or a combination of engine modules configured to define reporting rules associated with data throughput optimization.

Figure 1:
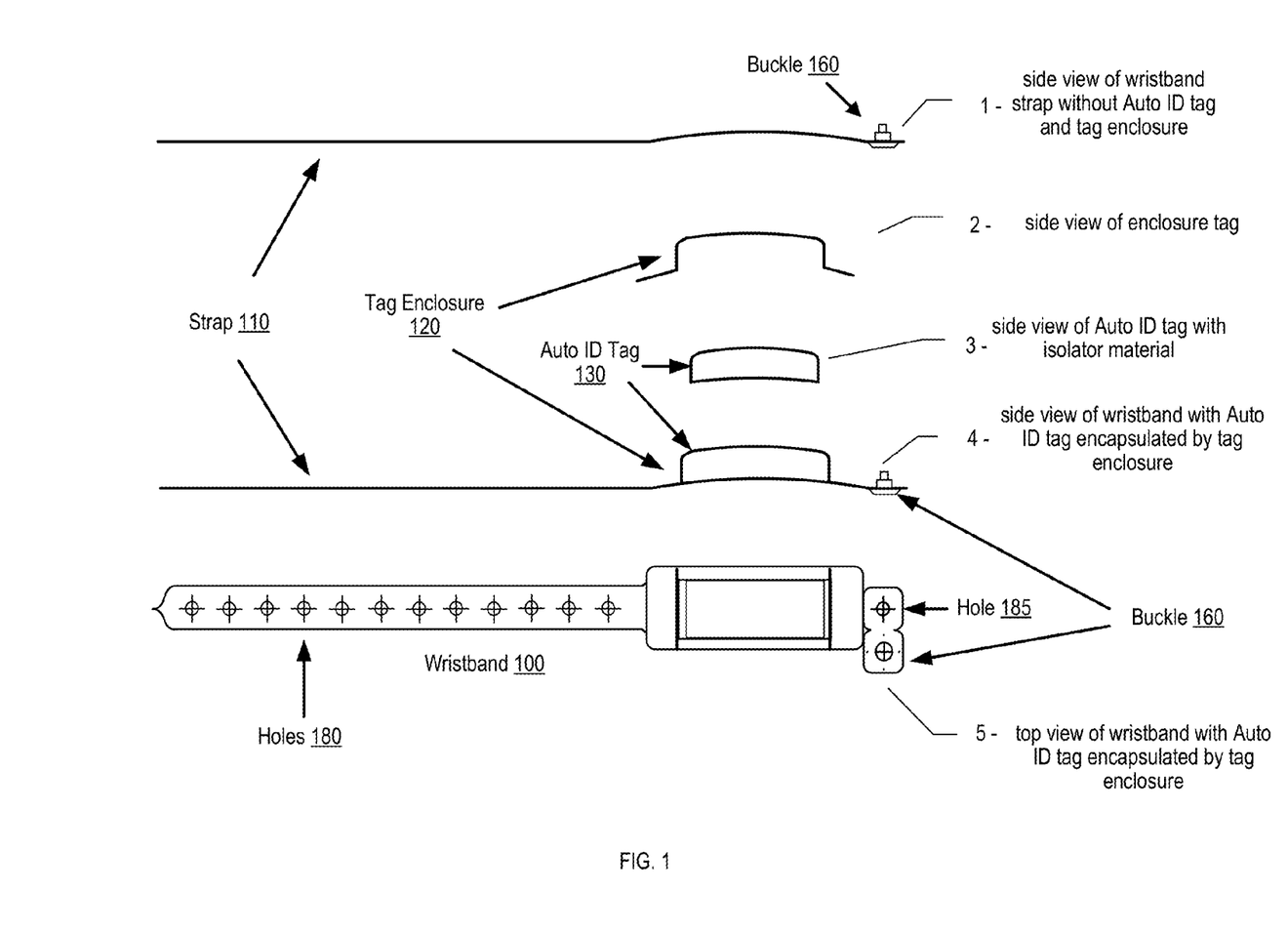
FIG. 1 a schematic diagram that illustrates components of a wristband, according to an embodiment.

FIG. 1 is a schematic diagram that illustrates components of a wristband 100, according to an embodiment. The wristband 100 can be similar to the wristband described in the '289 application.

The wristband 100 can be attached to a subject, such as a human, an animal, or an object. For example, the wristband 100 can be worn by a patient on his or her wrist or other body part (e.g., neck, ankle). As another example, the wristband 100 can be used on a bird (e.g., tied around a foot of the bird) in a zoo. As yet another example, the wristband 100 can be attached to a medical instrument (e.g., tied around a cylindrical component of the medical instrument).

As shown in FIG. 1, the wristband 100 includes at least a strap 110, a tag enclosure 120 and an automatic identification (Auto ID) tag 130. The Auto ID tag 130 can implement one or more AIDC technologies. The Auto ID tag 130 can be, for example, a RFID tag. In some embodiments, the wristband 100 can include more components than those shown in FIG. 1. For example, the wristband 100 can include two Auto ID tags, each of which is encapsulated within a separate tag enclosure. As another example, the wristband 100 can include an information area (e.g., as described below) that displays information of the subject.

In some instances, each component of the wristband 110 can be made using any suitable material that is latex free and/or hypo-allergenic. In some instances, each material of the wristband 100 may be made of antimicrobial or microbial barrier protection materials. Alternatively or additionally, each material of the wristband 100 may be made of flame-resistant, lint-resistant, and/or abrasion-resistant materials. Alternatively or additionally, each material of the wristband 100 may be made of autoclaveable materials. In some instances, each material of the wristband 100 does not contain any harsh chemical additives. Also, some or all of the materials for the components of the wristband 100 can be waterproof and/or resistant to other fluids (e.g., oil, soda, blood). As a result, a person can wash while wearing the wristband 100 or the wristband 100 can be reused by utilizing sterilization techniques (e.g., autoclaving, disinfecting, etc.).

In some instances, the strap 110 and/or other components of the wristband 100 can include an isolator material to protect the Auto ID tag 130 from being negatively affected by the absorbing effects of human tissue or animal tissue. Such an isolator material can be any suitable material with a relatively low dielectric constant that is substantially close to the dielectric constant of air, such as, for example, porcelain (ceramic), mica, glass, plastics, oxides of various metals, etc. In such instances, when the wristband 100 is used on a human or an animal, the dielectric material can be positioned between the Auto ID tag 130 and the human's body or the animal's body. As a result, the antenna of the Auto ID tag 130 can be tuned based, in part, on the dielectric properties of the isolator material, which substantially prevents the Auto ID tag 130 from being impacted by the absorbing effects of human tissue or animal tissue. Thus, the isolator material can tune the antenna of the Auto ID tag 130 to operate at a substantially optimized or maximum transmit power or maximized backscatter response, such that relatively long distances of data transmission can be achieved by that antenna. In such instances, the need for special batteries or circuitry for the wristband 100 can be eliminated.

Additionally, the isolator material can be applied on a uniform surface or in a complex structure for the component(s) of the wristband 100. For example, the isolator material can be uniformly applied to a bottom surface of the Auto ID tag 130 (e.g., the part of the Auto ID tag 130 that is attached to and in contact with the strap 110) or a surface of the strap 110 (e.g., the side of the strap 110 that is attached to and in contact with the Auto ID tag 130). As another example, the isolator material can be applied to the bottom surface of the Auto ID tag 130 in a non-uniform manner that enables a substantially optimal effect for isolating the antenna of the Auto ID tag 130 from the human's tissue or animal's tissue.

In some embodiments, the strap 110 can include materials, structures, and/or other subcomponents that can provide energy to other components (e.g., the Auto ID tag 130) of the wristband 100. For example, the strap 110 can include one or more printed batteries, piezo-electric energy sources and/or materials, solar energy sources and/or materials, kinetic energy sources and/or materials, and/or the like.

Such materials, structures, and/or other subcomponents can be, for example, attached to a surface of the strap 110 or embedded within (e.g., made as a part of) the strap 110.

The strap 110 can be used to attach the wristband 100 to the subject. In an embodiment, the strap 110 includes a buckle 160 (aligned with a hole 185 as shown in FIG. 1) at one end, and a set of holes 180 arranged in a straight line (or in any other suitable formation) along the length (e.g., the center line, or offset from the center line, e.g., to provide surface area for printed or displayed information) of the strap 110. The buckle 160 can be buckled to any hole 180 such that the wristband 110 can be adjusted to an appropriate size, thus suitable to subjects of various sizes. The buckle 160 can be coupled, connected, or buckled to a hole 180, for example, by folding the portion of the strap 110 having the hole 185 towards the adjacent portion of the strap 110, placing the target hole 180 between the hole 185 and the buckle 160, and then pressing the buckle 160 into the hole 185 and through the target hole 180 such that the hole 180 and the buckle 160 are connected. Once connected, the portion of the strap 110 having the hole 185 is disposed between the portion of the strap 110 having the buckle 160 and the portion of the strap 110 having the target hole 180, with a portion of the buckle 160 being disposed within the hole 185 and a portion of the buckle 160 being disposed within the hole 180. Such a connection between the buckle 160 and a hole 180 can be a permanent connection (i.e., the buckle 160 cannot be unbuckled from the hole 180) or a temporary connection (i.e., the buckle 160 can be unbuckled from the hole 180). In some embodiments, although not shown in FIG. 1 or described herein, other locking mechanism (permanent or temporary) can be used to transform the strap 110 into a loop.

As shown in FIG. 1, the tag enclosure 120 houses, encapsulates, or hermetically seals the Auto ID tag 130. The tag enclosure 120 can attach the Auto ID tag 130 to the strap 110 using, for example, adhesive, a tab or slot arrangement, ultrasonic welding, fusion bonding, and/or the like. in an embodiment, the tag enclosure 120 can be attached to the strap 110 at a specific position of the strap 110, and not removable from the strap 110. In other words, once the tag enclosure 120 is fixedly attached to the strap 110, the position of the tag enclosure 120 with respect to the strap 110 will not change. Alternatively, the tag enclosure 120 can be removable from the strap 110.

In some instances, the tag enclosure 120 can be made of durable, moisture proof, and/or hypo-allergenic material, such that the tag enclosure 120 can function as a barrier to protect the Auto ID tag 130 from fluid or other types of harm (e.g., impact). Other embodiments related to the strap and tag enclosure of a wristband are shown and described with respect to FIGS. 2 and 3.

In some instances, the Auto ID tag 130 can be a passive RFID tag such as, for example, a passive UHF RFID tag. Such a passive UHF RFID tag can have a relatively large read range such that a wristband equipped with this passive UHF RFID tag can be used for continuous monitoring of moving humans, animals, or other objects within an environment equipped with RFID read zones (e.g., equipped with RFID readers). In other instances, the Auto ID tag 130 can be any other type of RFID tag or other type of Auto ID tag such as, for example, an active RFID tag, a BAP RFID tag, a barcode, and/or the like. Additionally, each Auto ID tag (e.g., the Auto ID tag 130) can have a variable memory size to fit the application needs.

In some instances, the Auto ID tag 130 can be connected to a circuit (e.g., a RFID circuit, not shown in FIG. 1) that is attached to or embedded within the strap 110. When the buckle 160 is buckled into a hole 180, a circuit loop can be formed for the circuit, which then activates the Auto ID tag 130 (e.g., turns on the Auto ID tag 130 or changes its status from an inactive mode to an active mode). In some instances, after the buckle 160 is buckled to a hole 180, the buckle 160 can be unbuckled from that hole 180. Thus, the Auto ID tag 130 can be activated and/or inactivated repeatedly. In other instances, once the buckle 160 is bucked to a hole 180, the buckle 160 cannot be unbuckled, and thus the wristband 110 is permanently or fixedly locked. In such instances, the only way to remove the wristband 110 from the subject is to cut the strap 110, which makes the circuit un-usable and also permanently destroys or renders the wristband 100 unusable.

In some instances, the wristband 100 can have an informational area (not shown in FIG. 1) where information about the subject (e.g., human, animal, object), on which the wristband 100 is used, can be displayed. Such information can include, for example, a name of a patient, information of the owner of a pet, a serial number of a consumer product, a barcode associated with a medical instrument, and/or the like. The information can be, for example, printed, pasted, laser-etched, digitally displayed using a programmable display (e.g., using electronic ink technology, Organic Light Emitting Diode (OLED)), etc. The information area can be on the strap 110 (e.g., on one or both sides of the strap 110), on the front surface of the enclosure 120, on a side surface of the enclosure 120, and/or on any other suitable location on the wristband 100. Additionally, in some instances, the tag enclosure 120 can be made of a clear, anti-glare material such that the information displayed on or within the tag enclosure 120 can be easily read or accessed.

For example, a barcode, including identification information of a patient, can be printed on the front surface of the strap 110 using a standard barcode printer. As another example, a programmable display (e.g., a LCD (liquid crystal display) screen, a LED (light-emitting diode) screen, OLED, an electronic paper, etc.) can be attached to the surface of the strap 110 and configured to digitally display information associated with a subject (e.g., price of a consumer product, blood glucose level of a patient, type of access pass for a resort (e.g., season pass, day pass for a skier at a ski slope), etc.). In such an example, information of the subject that is displayed on the programmable display can be digitally updated using, for example, an Auto ID reader (e.g., a RFID scanner, a barcode reader, etc.). Specifically, the Auto ID reader can obtain updated information of the subject by scanning, for example, an updated barcode associated with the subject. The Auto ID reader can then send, via a RF connection, the updated information to a processor (e.g., a silicon chip, integrated circuit, radio frequency integrated circuit (RFIC), software defined radio (SDR), etc.) associated with a programmable display attached to the surface of the strap 110. The processor can process and then display the received information on the programmable display.

In some instances, the wristband 100 can include a flash memory to store data, and a connector (e.g., an integrated universal serial bus (USB) interface, a serial connector, Inter-Integrated Circuit (I²C) connection, three-wire connection, and the like) to read data from and/or write data to the flash memory. Data stored in the flash memory can be displayed at the informational area described above, and/or can be associated with the Auto ID tag 130. The flash memory and/or the connector can be implemented within the tag enclosure 120 and/or embedded within or attached to the strap 110. In an embodiment, the wristband 100 can be physically connected to any computing device (e.g., a computer, a mobile device) using the connector, such that data can be downloaded from and uploaded to the flash memory without being transmitted over the air, thus enhancing security of data transmission between the wristband 100 and the computing device. For example, data associated with the Auto ID tag 130 can be read by an Auto ID reader via a physical connection using the connector. As another example, data associated with displaying information on a programmable display of the wristband 100 can be uploaded to the flash memory from a mobile communication device (e.g., a tablet, a smart phone) via a physical connection using the connector. As a result, the programmable display can be programmed (using a special program such as LED display software), based on the received data, to display the information accordingly. Additionally, in some instances, data transmission (via a physical connection or a wireless connection) between the wristband 100 and any device (e.g., an Auto ID reader, a computing device) can be encrypted using a suitable encryption mechanism, such that further security enhancement is provided for the data transmission.

In some instances, the wristband 100 can be equipped with RFID, and/or one or more other automatic identification technologies such as, for example, a barcode (e.g., a one-dimensional or two-dimensional barcode), a QR code, etc. In such instances, a label implementing such an automatic identification technology can be displayed (e.g., printed, laser etched, digitally displayed) at the informational area described above or any other suitable location of the wristband 100.

Figure 2:
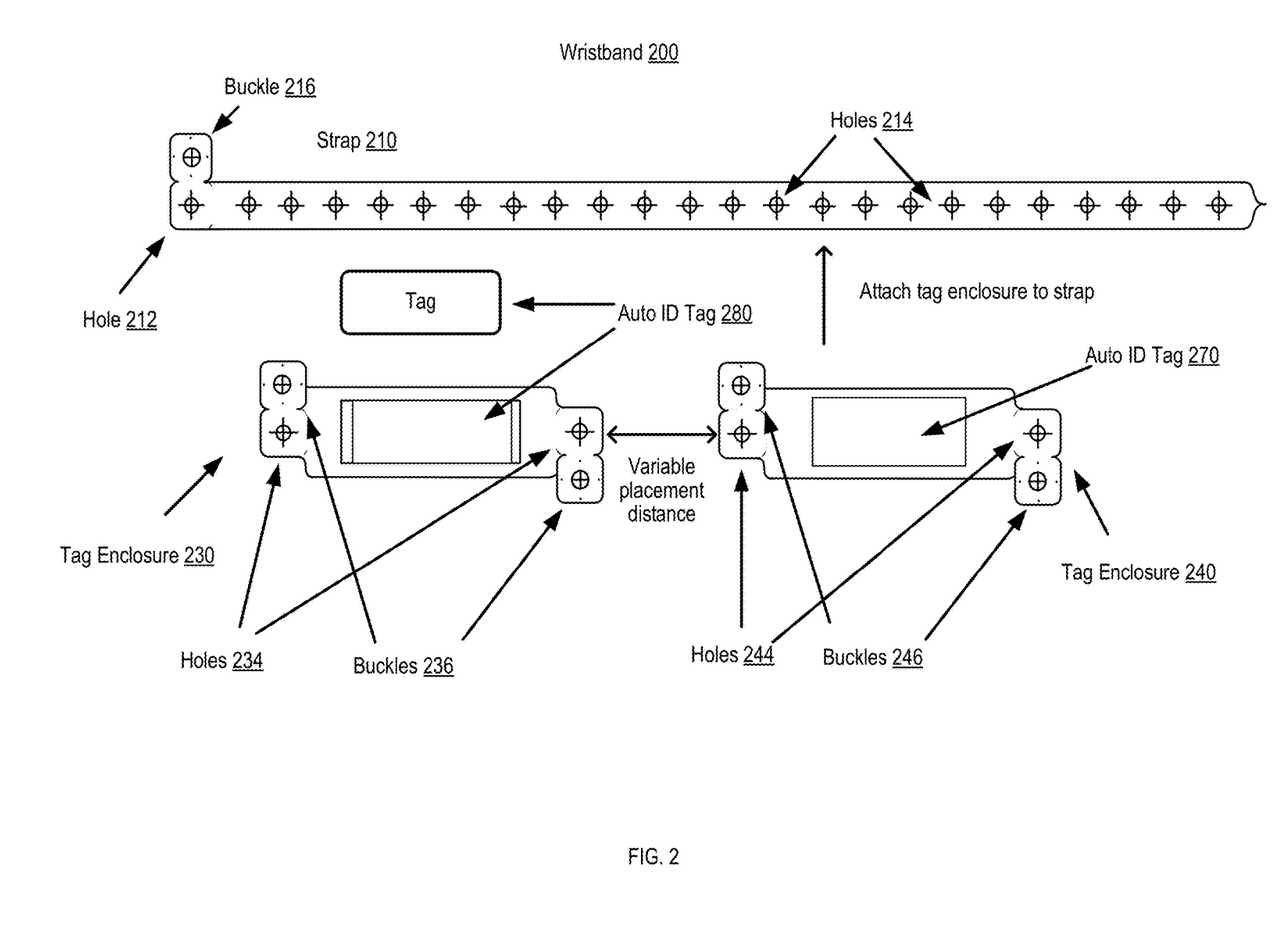
FIG. 2 is a schematic diagram that illustrates components of a wristband, according to an embodiment.

FIG. 2 is a schematic diagram that illustrates components of a wristband 200, according to an embodiment. The wristband 200 can be structurally and functionally similar to the wristband 100 shown and described with respect to FIG. 1. As shown in FIG. 2, the wristband 200 includes at least a strap 210, one or more tag enclosures 230 and 240, and one or more Auto ID tags 270 and 280. Similar to the Auto ID tag 130 shown and described with respect to FIG. 1, the Auto ID tags 270, 280 can implement one or more AIDC technologies. In some embodiments, the wristband 200 can include more components than those shown in FIG. 2. For example, the wristband 200 can include more or less than two Auto ID tags, each of which is encapsulated within a separate tag enclosure. As another example, similar to the wristband 100, the wristband 200 can include an information area (described above) that displays information of the subject on which the wristband 200 is used.

The strap 210 is structurally and functionally similar to the strap 110 of the wristband 100 in FIG. 1. Specifically, the strap 210 includes a buckle 216 at one end, which is aligned with a hole 212, and a set of holes 214 arranged in a straight line (or in any other suitable formation) along the length (e.g., along a center line or offset from the center line) of the strap 210. Similar to the buckle 160 and the holes 180 of the strap 110 in FIG. 1, the buckle 216 can be buckled to any hole 214 such that the wristband 210 can be adjusted to an appropriate size. Moreover, the materials of the strap 210 can be similar or identical to the materials of the strap 110 described with respect to FIG. 1.

Similar to the tag enclosure 120 of the wristband 100 in FIG. 1, the tag enclosures 230, 240 may house, encapsulate, or hermetically seal the RFID tags 280, 270, respectively. The tag enclosures 230, 240 also attach the Auto ID tags 280, 270, respectively, to the strap 210. The materials of the tag enclosures 230, 240 can be similar or identical to the materials of the tag enclosure 120 described with respect to FIG. 1. The Auto ID tags 270, 280 can use the same type or different types of RFID technologies or other automatic identification technologies. For example, the Auto ID tags 270, 280 can both be passive RFID tags. As another example, the Auto ID tag 270 can be an active RFID tag, and the Auto ID tag 280 can be a BAP RFID tag.

In an embodiment, the tag enclosure 230 or 240 can be attached to and detached from the strap 210. Specifically, the tag enclosure 230 may include two buckles 236 at the two ends of the tag enclosure 230; the tag enclosure 240 may include two buckles 246 at the two ends of the tag enclosure 240. Similar to the buckle 160 in FIG. 1 and the buckle 216 of the strap 210, each buckle 236 and 246 is aligned with a hole 234 and 244, respectively. Each buckle 236 or 246 can be buckled to a hole 214 of the strap 210 in a similar way as described above with respect to FIG. 1.

After the two buckles 236 or the two buckles 246 are buckled to two holes 214, the corresponding tag enclosure 230 or 240 is attached to the strap 210 at a position on the strap 210. Furthermore, the buckles 236 or 246 can be unbuckled from the holes 214, thus detaching the corresponding tag enclosure 230 or 240 from the strap 210. Thus, the tag enclosure 230 or 240 can be attached to the strap 210 at any position of the strap 210, and can be changed from one position to another position with respect to the strap 210. As a result, the Auto ID tags 270 and 280 (encapsulated within the tag enclosures 240 and 230, respectively) can be placed with an adjustable or selectable space in between, and the space between the two Auto ID tags can be changed based on varying applications, environments, and/or uses.

In some instances, two or more Auto ID tags (similar or identical to the Auto ID tags 270, 280) can be attached to the strap 210 with certain distance(s) in between such that, when the wristband 200 is looped around a person's wrist, at least one Auto ID tag is visible to (i.e., readable by) a reader device (e.g., a RFID reader) within a certain range from the wristband 200 at any given time, regardless of the relative position of the wristband to that reader device (e.g., when the person's wrist blocks the line-of-sight between the reader device and another Auto ID tag). For example, the Auto ID tags 270 and 280 can be attached to the strap 210 at certain positions such that they are opposite to each other on the loop formed by the strap 210. That is, the distance between the two Auto ID tags along the strap 210 measured from one side of the Auto ID tag 270 is substantially identical to the corresponding distance measured from the other side of the Auto ID tag 270. As a result, when the wristband 200 is looped around a person's wrist, at least one of the Auto ID tags 270, 280 is visible, at any given time, to an Auto ID reader that has a line of sight (i.e., not blocked by an object or human) to the wristband 200. Thus, data can be read from one of the Auto ID tags even when the other Auto ID tag is not visible (e.g., blocked by the person's wrist) to the Auto ID reader.

Moreover, in some instances, a tag enclosure (e.g., the tag enclosure 230 or 240) can be attached to the strap 210 from either side of the strap 210. Thus, when multiple Auto ID tags (encapsulated within tag enclosures) are attached to the strap 210 on both sides of the strap 210, signals (e.g., RFID signals) transmitted towards both sides of the strap 210 can potentially be received by those Auto ID tags, thus significantly increasing the coverage of the wristband 200 with respect to data transmission and signal detection.

Additionally, if a user wishes to use only other automatic identification technologies (e.g., barcode) for identification but not the RFID tags, the other technologies can be implemented directly on the strap 210 (e.g., the barcode can be printed on the strap 210). In such scenarios, the RFID tag and tag enclosure may not be used, which can reduce the overall cost of the wristband 200.

Figure 3:
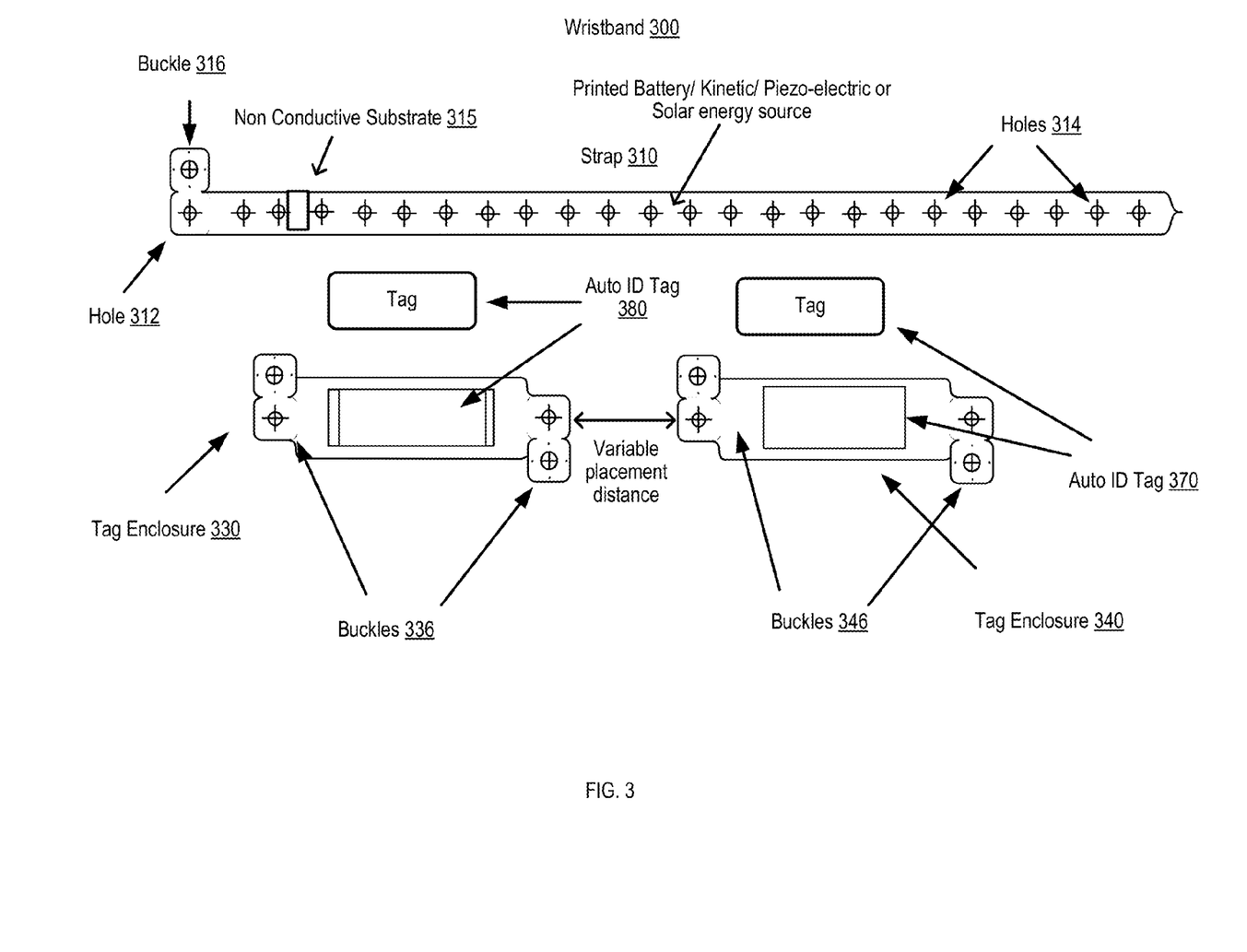
FIG. 3 is a schematic diagram that illustrates components of a wristband, according to an embodiment.

FIG. 3 is a schematic diagram that illustrates components of a wristband 300, according to an embodiment. The wristband 300 can be structurally and functionally similar to the wristbands 100 and 200 shown and described with respect to FIGS. 1 and 2, respectively. As shown in FIG. 3, the wristband 300 includes at least a strap 310, one or more tag enclosures 330 and 340, and one or more Auto ID tags 370 and 380. Similar to the Auto ID tag 130 shown and described with respect to FIG. 1, the Auto ID tags 330, 340 can implement one or more AIDC technologies. In some embodiments, the wristband 300 can include more components than those shown in FIG. 3. For example, the wristband 300 can include more or less than two Auto ID tags, each of which is encapsulated within a separate tag enclosure. As another example, similar to the wristbands 100, 200 shown and described with respect to FIGS. 1 and 2, the wristband 300 can include an information area (described above with respect to FIG. 1) that displays information of the subject on which the wristband 300 is used.

The strap 310 is structurally and functionally similar to the straps 110 and 210 shown and described with respect to FIGS. 1 and 2, respectively. For instance, the strap 310 may include a buckle 316 at one end, which is aligned with a hole 312, and a set of holes 314 arranged in a straight line (or in any other suitable formation) along the length (e.g., along the center line or offset from the center line) of the strap 310. Similar to the tag enclosures 230 and 240 of the wristband 200 in FIG. 2, the tag enclosures 330, 340 house or encapsulate the Auto ID tags 380, 370, respectively. Similar to the Auto ID tags 270, 280 in FIG. 2, the Auto ID tags 370, 380 can use the same type or different types of RFID technologies or other automatic identification technologies such as, for example, passive RFID, active RFID, BAP RFID, barcode, etc.

The tag enclosures 330 and 340 may have the same structure as the tag enclosures 230 and 240, including the buckles 336, 346 that may be structurally and functionally similar to the buckles 236, 246 shown and described with respect to FIG. 2. Thus, the tag enclosures 330, 340 can be attached to and detached from the strap 310. As a result, the Auto ID tags 370 and 380 (encapsulated within the tag enclosures 340 and 330, respectively) can be placed with an adjustable or selectable space in between, and the space between the two Auto ID tags can be changed based on varying applications, environments, and/or uses. Additionally, in some embodiments, the tag enclosure 330 or 340 can be a conductive tag enclosure as described below.

In an embodiment, the strap 310 includes a nonconductive substrate 315 (e.g., located between two holes 314 of the strap 310 as shown in FIG. 3). The nonconductive substrate 315 separates the strap 310 into two portions that are not conductively connected to each other. Specifically, as shown in FIG. 3, the portion of the strap 310 to the left of the nonconductive substrate 315 (the portion including the buckle 316) is not conductively connected to the portion of the strap 310 to the right of the nonconductive substrate 315 (the portion including most of the holes 314). Furthermore, in some instances, the two portions of the strap 310 are not conductively connected unless a conductive tag enclosure (e.g., the tag enclosure 330 or 340) including a conductive material connects the two portions of the strap 310. For example, the tag enclosure 330 (which is a conductive tag enclosure including a conductive material) can be attached to the strap 310, where one buckle 336 can be buckled to a hole 314 within the left portion of the strap 310, and the other buckle 336 can be buckled to a hole 314 within the right portion of the strap 310. Thus, the two portions of the strap 310 are conductively connected to each other by the conductive tag enclosure 330 that functions as a conductive bridge.

In an embodiment, the strap 310 can be conductive. Alternatively, the strap 310 may comprise a non-conductive material and a conductive material or layer that is encapsulated or enclosed by the non-conductive material (e.g., to protect the conductive layer). In either case, a conductive flow occurs when the conductive buckles 316, 336, 346 either pinch through or are snapped through one of holes 314 to form a conductive contact.

In some instances, the wristband 300 can include a circuit (not shown in FIG. 3) attached to or embedded within the strap 310, which is similar to the circuit described with respect to FIG. 1. Such a circuit can be connected to an Auto ID tag (e.g., the Auto ID tag 370 or 380) when that Auto ID tag is attached to the strap 310. The circuit can perform a special function associated with the automatic identification and tracking operation performed by the Auto ID tag. Such a special function can be, for example, providing energy to the Auto ID tag, enabling an antenna of the Auto ID tag to transmit/receive data, enabling a sensor to monitor a pulse of a person or a temperature of the surrounding environment, and/or the like.

In some instances, when the two portions of the strap 310 are conductively connected (e.g., by a conductive tag enclosure) and the strap 310 forms a loop (e.g., the buckle 316 is buckled to a hole 314), the circuit is completed (i.e., a circuit loop is formed), and thus activated. As a result, the special function is performed by the completed circuit, and the automatic identification and tracking operation is activated or enabled. When the two portions of the strap 310 are conductively disconnected (e.g., not connected by a conductive tag enclosure) and/or the strap 310 does not form a loop (e.g., the buckle 316 is not buckled to a hole 314), the circuit is not completed (i.e., a circuit loop is not formed). Thus, the circuit is deactivated. As a result, the special function is not performed by the circuit, and the automatic identification and tracking operation is disabled or impacted.

For example, the circuit can be part of a printed battery that, when completed and activated, provides energy to a BAP RFID tag attached to the strap 310. When the two portions of the strap 310 are conductively disconnected or the strap 310 does not form a loop, the circuit is not completed, and thus deactivated. As a result, the printed battery is inactive or disconnected from the BAP RFID tag, and thus the BAP RFID tag is not operating. This can save battery power, for example, before use (extending shelf life) or between uses (extending battery life). When the two portions of the strap 310 are conductively connected by a conductive tag enclosure and the strap 310 forms a loop, the circuit is completed, and thus, activated. As a result, the printed battery is operative or connected to the BAP RFID tag, and thus, the BAP RFID tag is operating. Therefore, when a user of the wristband 300 wants to disable the BAP RFID tag (e.g., to extend the service life of the printed battery and/or the BAP RFID tag), the user can remove the tag enclosure 330 or 340 that connects the two portions of the strap 310 from the strap 310, conductively disconnecting the two portions of the strap 310 to deactivate the printed battery.

As another example, the circuit can be part of a printed battery that, when completed and activated, transforms a RFID tag attached to the strap 310 from a pure passive RFID tag into a BAP tag. When the two portions of the strap 310 are conductively disconnected or the strap 310 does not form a loop, the circuit is not completed, and thus, deactivated. As a result, the printed battery is inactive or disconnected from the RFID tag, and thus, the RFID tag operates as a pure passive RFID tag. When the two portions of the strap 310 are conductively connected by a conductive tag enclosure and the strap 310 forms a loop, the circuit is completed, and thus, activated. As a result, the printed battery is operative or connected to the RFID tag, and thus, the RFID tag operates as a BAP tag. Additionally, such a RFID tag can have a flag setting or digital switch that can be electronically controlled by a control device via, for example, a RF connection. When the flag or the switch is turned off (e.g., in response to receiving a signal from the control device), the printed battery is disconnected (regardless of the connection of the two portions of the strap 310), thus causing the RFID tag to operate as a pure passive RFID tag. Therefore, when a user of the wristband 300 wants to make the RFID tag operate as a passive RFID tag (e.g., to extend the service life of the printed battery and/or the RFID tag), the user can remove the conductive tag enclosure 330 or 340 that connects the two portions of the strap 310 from the strap 310 (i.e., conductively disconnecting the two portions of the strap 310) to deactivate the printed battery. When the user wants to make the RFID tag operate as a BAP RFID tag (e.g., to provide a better service or render a better performance), the user can connect the two portions of the strap 310, using the conductive tag enclosure 330 or 340, to activate the printed battery. Similarly, when an operator of the control device wants to make the RFID tag operate as a passive RFID tag, the operator can operate the control device to remotely turn off the flag or the switch of the RFID tag to deactivate the printed battery. When the operator wants to make the RFID tag operate as a BAP RFID tag, the operator can operator the control device to remotely turn on the flag or the switch of the RFID tag to activate the printed battery.

In an embodiment, the circuit can be part of an antenna circuitry that, when completed and activated, enables an antenna of an active RFID tag attached to the strap 310 to transmit data. When the two portions of the strap 310 are conductively disconnected or the strap 310 does not form a loop, the circuit is not completed, and thus, deactivated. As a result, the antenna circuitry is deactivated, and thus, the antenna is not operating. When the two portions of the strap 310 are conductively connected by a conductive tag enclosure and the strap 310 forms a loop, the circuit is completed, and thus, activated. As a result, the antenna circuitry is activated, and thus, the antenna is operating. Therefore, when a user of the wristband 300 wants to disable the active RFID tag (e.g., to extend the service life of the active RFID tag), the user can remove the tag enclosure 330 or 340 that connects the two portions of the strap 310 from the strap 310, conductively disconnecting the two portions of the strap 310 to deactivate the antenna circuitry.

In an embodiment, the wristband 300 can include a power source device (not shown in FIG. 3) that is connected to one or more RFID tags via the circuit attached to or embedded within the strap 310 as described above. Each of the RFID tag(s) can operate as a pure passive RFID tag or a BAP RFID tag. Such a power source device can include, for example, a build-in battery (e.g., a lithium battery cell), a power-generating device (e.g., a kinetic power generator, a solar panel, a piezo-electric power generator, etc.), or any other suitable device that can produce power for the RFID tag(s). A build-in battery can be a replaceable battery or rechargeable battery. In some instances, a rechargeable battery included in the wristband 300 can be recharged by, for example, a physical connection (e.g., a USB connector, a serial connector) to an external device (e.g., a computing device, a mobile communication device, a power source device, another battery, etc.). In some other instances, a rechargeable battery of the wristband 300 can be recharged by natural resources or energy resources generated by the wristband 300 such as, for example, solar energy, wind power, kinetic movement of the wristband 300, heat differential (e.g., between human tissue and surrounding environment), electromagnetic induction, and/or the like.

As described above, when the two portions of the strap 310 are conductively connected by a conductive tag enclosure, the circuit is completed, and thus, the power source device is operative and power is provided to the RFID tag(s). As a result, the RFID tag(s) can be transformed from pure passive RFID tag(s) into BAP RFID tag(s).

Figure 4:
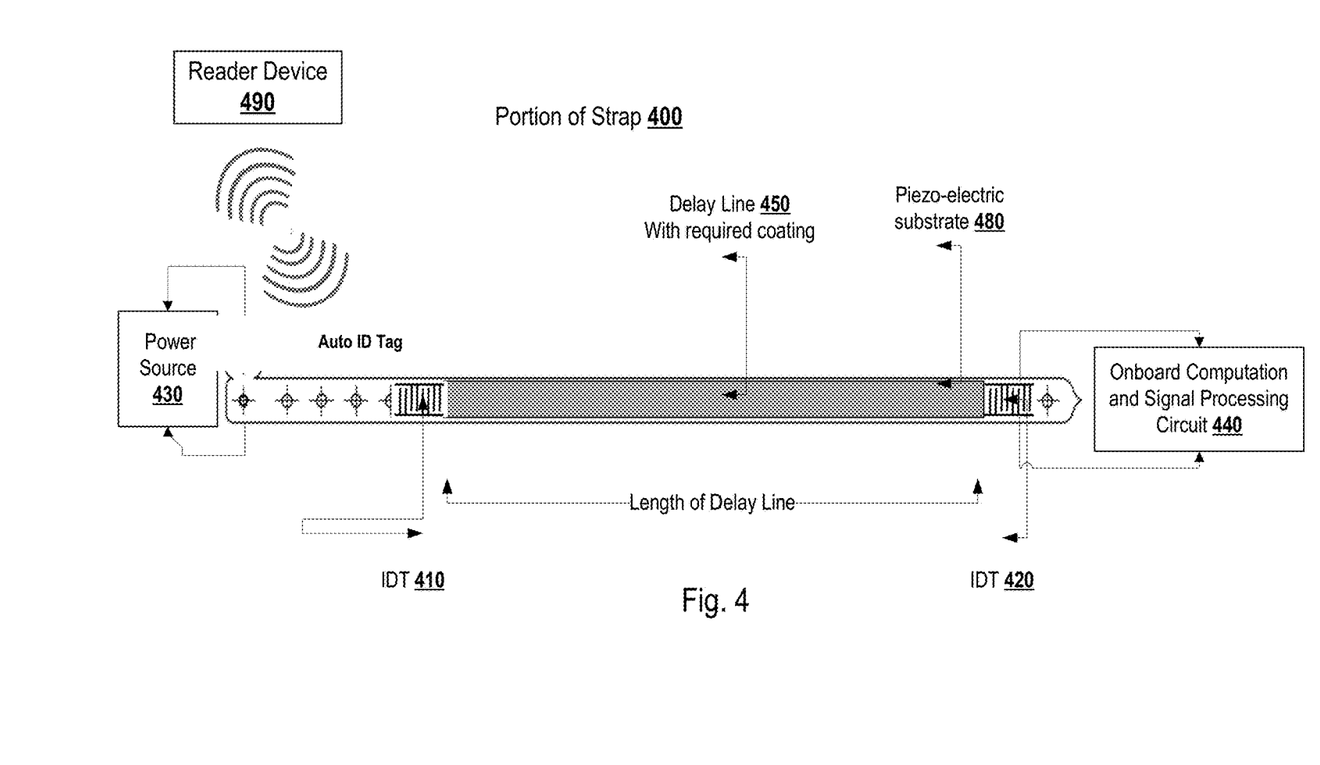
FIG. 4 is a schematic diagram illustrating a portion of a strap of a wristband that employs a surface acoustic wave (SAW) sensor technology, according to an embodiment.

FIG. 4 is a schematic diagram illustrating a portion of a strap 400 of a wristband that employs a SAW sensor technology, according to an embodiment. The strap 400 can be structurally and functionally similar to the straps 110, 210, 310 shown and described with respect to FIGS. 1-3, respectively. In an embodiment, the strap 400 employs a SAW sensor technology. In some instances, the wristband can include one or more sensors employing the SAW sensor technology and/or any other suitable sensor technology.

As shown in FIG. 4, the strap 400 includes a piezoelectric substrate 480, which is made of piezoelectric materials such as, for example, quartz, lithium niobate, lithium tantalate, lanthanum gallium silicate, etc. The piezoelectric substrate 480 can function as a source of energy as described above with respect to FIGS. 1 and 3. The strap 400 may contain two sets of interdigital transducers (IDTs) 410, 420. The strap 400 includes a delay line 450 that is between and connects the two IDTs 410 and 420.

The piezoelectric substrate 480 helps to convert an electrical signal, generated by the input IDT 410, into an acoustic wave. The acoustic wave travels from the input IDT 410 to IDT 420 through the delay line 450. A coating may be applied to the delay line 450 in order to change the mechanical, surface wave, e.g., by altering characteristics of the wave. The particular coating used may depend on the type of sensor needed or desired. When the wave reaches the output IDT 420, the wave is converted back into an electrical signal (i.e., the piezoelectric effect). The output signal then represents a sensor output.

The IDT 420 is connected to an onboard computation and signal processing circuit 440 that can be any type of computing device embedded within or attached to the strap 400, and configured to perform computing and/or signal processing functions. In some instances, the onboard computation and signal processing circuit 440 can include a RFID circuit. In some instances, although not shown in FIG. 4, the strap 400 can include more or less than two IDTs. As discussed above, the IDTs of the strap 400 can be used to convert acoustic waves to electrical signals and vice versa by exploiting the piezoelectric effect of the piezoelectric substrate 480. Furthermore, the wristband may include an Auto ID tag (not shown in FIG. 4, but similar or identical to the Auto ID tags shown and described with respect to FIGS. 1-3) that is digitally connected to the portion of the strap 400 that employs the SAW sensor technology. A reader device 490 (e.g., a RFID scanner, a barcode reader) can communicate with and read data from the Auto ID tag via, for example, a RF connection. In this manner, the sensor output from the output IDT 420 is converted into a RF signal which is then sent by an Auto ID tag to the RFID reader device 490.

Additionally, the wristband can optionally include a power source 430 (e.g., a backup battery) that can provide power to the components of the wristband (e.g., the Auto ID tag, IDTs, onboard computation and signal processing circuit 440, etc.) when, for example, the piezo-electric substrate 480 does not function as a source of energy to provide power to those components of the wristband.

The delay line 450 can have a coating that can react to environmental change(s) (e.g., a coating having a high carbon monoxide content that reacts in the event of fire). Several conditions (e.g. vapor, humidity, temperature, motion, etc. or any other chemical or physical condition) can be detected using the SAW sensor technology by coating the portion of the strap 400 that implements the delay line 450 with material or polymers that undergo changes in their conductivity, mass, or elasticity when exposed to those conditions. For example, the coating can cause the delay line 450 to change in length along the surface of the strap 400 in response to an environmental change (e.g., a change in pressure, strain, torque, temperature, and/or other environmental conditions). Such a change in the length of the delay line 450 can affect the spacing between the interdigital electrodes of the IDT 410 or 420 (which then alters the pitch of the output electrical signal from the IDT), and/or affect the spacing between the two IDTs 410 and 420 (which then alters the delay of the output electrical signal from the IDTs). As a result, the environmental change(s) can be sensed based on a change (e.g., a phase-shift, frequency-shift, delay in time, etc.) in the output electrical signal (e.g., a tag response signal, a signal indicating updates in certain fields in a memory associated with the Auto ID tag), which is sent from the Auto ID tag to the reader device 490.

In the embodiment illustrated in FIG. 4, a signal processing circuit 440 may assign a binary value or set a flag in the Auto ID tag (e.g., on a RFID chip) based on the sensor output from IDT 420. Then, when queried by the RFID reader device 490, the Auto ID tag will send this binary or digital information over RF to the reader device 490. In an alternative embodiment, RFID antenna(s) (e.g., antenna 520 in FIG. 5) may be connected directly to the output IDT 420, such that a change in the acoustic wave transmitted via the delay line 450 is directly converted into a backscatter response that is transmitted to the reader device 490. At this point, the reader device 490 can convert the analog backscatter response into measured or sensed data by using special firmware.

As an illustrative, non-limiting example, the piezoelectric substrate 480, input IDT 410, output IDT 420, and delay line 450 may be configured as a blood sugar monitoring SAW sensor. In such an embodiment, a coating for sensing glucose levels on skin may be applied to the delay line 450. Specifically, the coating can be chosen such that it changes the acoustic wave across the delay line 450 in proportion to the glucose level in the body. This information can then be converted into a RF signal which is wirelessly transmitted by the Auto ID tag to the reader device 490. The reader device 490 can, in turn, be connected (e.g., via a wired or wireless connection) to a system (e.g., server or controller) that can send an automatic alert to either the patient whose glucose level is being monitored (i.e., the patient wearing the wristband comprising the Auto ID tag) and/or medical staff. In this manner, the patient can be provided the required insulin shots or medication to bring his or her glucose levels to a normal or acceptable state.

In some embodiments, signal strength of the signal sent from a RFID tag (e.g., an active RFID tag, a BAP RFID tag, a passive RFID tag) of a wristband can be associated with the environment (e.g., light intensity, temperature, air movement), or kinetic or motion activities of a subject on which that wristband is used. For example, the signal can be strengthened when the kinetic or motion activities of the subject increase, weakened when the kinetic or motion activities decrease, and diminished when the kinetic or motion activities stop. As another example, the signal can be strengthened when a body temperature (e.g., measured by a temperature sensor included in the wristband) of the subject increases, and weakened when the body temperature decreases. Firmware may be provided on the Auto ID tag to measure the acoustic waves and convert them into meaningful data. Software can be used (e.g., stored at a memory and/or operating at a processor at a reader device) to derive the temperature increase or decrease from changes in backscatter and/or tag response signal strengths. In such embodiments, operations of reading data from the RFID tag can be associated with the signals received from the RFID tag.

Furthermore, an alert or alarm can be triggered based on the detected temperature change, kinetic or motion activities of the subject, which are determined based on backscatter signals and/or tag response signals received from the RFID tag. For example, data can be read or processed from the RFID tag only when the signal strength of the signals received from the RFID tag is above a threshold. As another example, data can be read or processed from the RFID tag only when the signal strength of the signals received from the RFID tag has been maintained at a level above a threshold for a certain period of time. As yet another example, an alert can be triggered when the detected movement (e.g., determined based on signals received from the RFID tag) of the subject crosses a threshold.

As an example, a patient in a hospital can wear a wristband having one or more RFID tags. The RFID tag(s) send signals when the patient moves, and the signal is strengthened when the speed of the patient increases. When the signal strength is above a certain threshold, a RFID reader starts to read or process data from the RFID tag(s). Furthermore, when the data determined from the signals received from the RFID tag(s) indicate that the movement of the patient (e.g., speed, duration, distance) crosses a threshold, an alert is triggered, and a caregiver may be sent to check out the patient's status. Similarly, the wristband can have a temperature sensor that monitors the body temperature of the patient, and the signal sent from the RFID tag(s) of the wristband is strengthened when the measured body temperature increases. Thus, an alert can be triggered when the detected body temperature of the patient indicates that the patient is having a fever, such that a caregiver can be sent to check on the patient.

Figure 5:
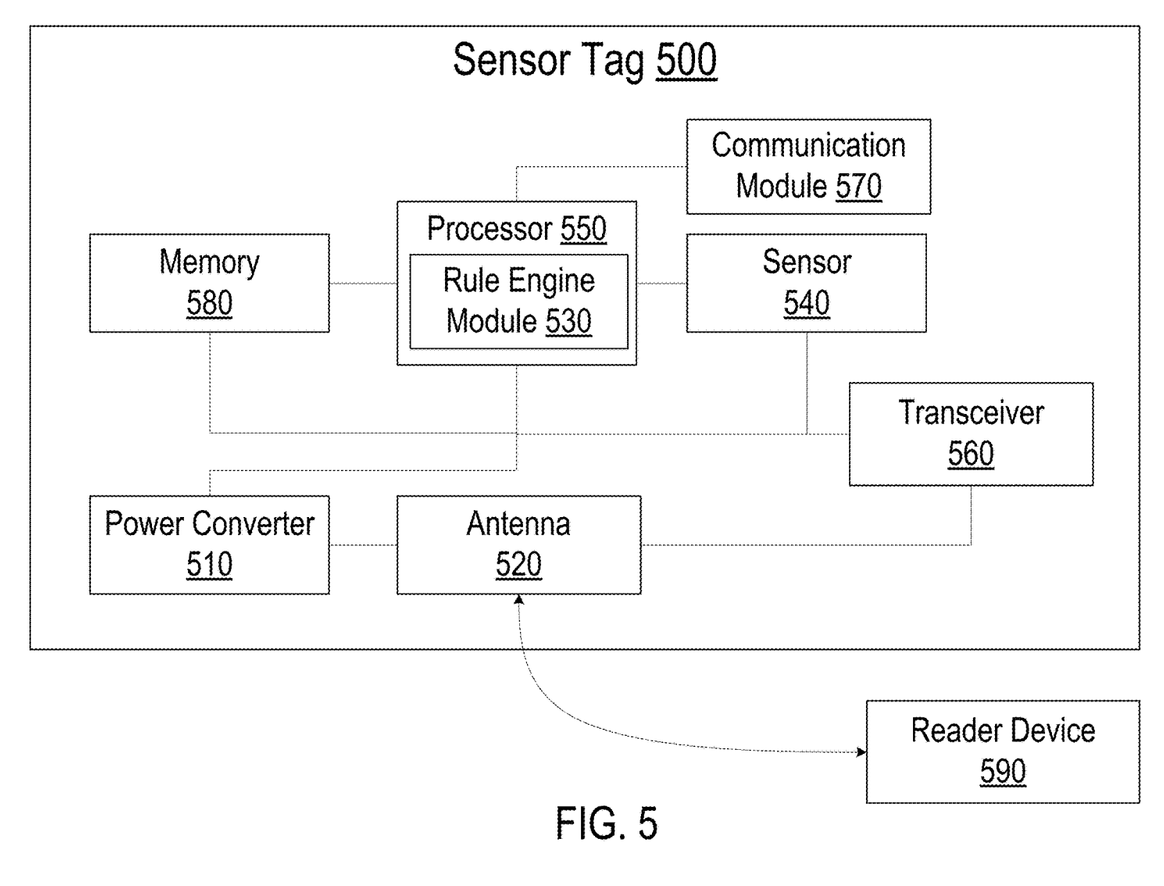
FIG. 5 is a block diagram of a sensor tag, according to an embodiment.

FIG. 5 is a block diagram of a sensor tag 500, according to an embodiment. The sensor tag 500 can be similar or identical to the Auto ID tags shown and described with respect to FIGS. 1-4. Particularly, the sensor tag 500 can be included in a wristband and attached to a strap of that wristband in a similar or identical manner as shown and described with respect to FIGS. 1-4. In some instances, the sensor tag 500 can be structurally and/or functionally different from the Auto ID tags in FIGS. 1-4. The sensor tag 500 can be attached to a wristband using any suitable mechanism such as, for example, adhesive, tab or slot arrangement, ultrasonic welding, fusion bonding, tag enclosure, locking strip, rivet, screw, and/or the like.

As shown in FIG. 5, the sensor tag 500 includes an antenna 520, a power converter 510, a memory 580, a communication module 570, a sensor 540, a transceiver 560, and a processor 550. Each component of the sensor tag 500 is operatively coupled to the remaining components of the sensor tag 500. In some instances, the sensor tag 500 can include more or less components than those shown in FIG. 5. For example, the sensor tag 500 can include more than one sensor and/or more than one antenna. As another example, the sensor tag 500 can be connected to and powered by an external energy source (e.g., a battery).

The transceiver 560 can be configured to enable and control the antenna 520 for transmitting data to and/or receiving data from reader devices such as a reader device 590 shown in FIG. 5. Specifically, for example, the transceiver 560 can control the antenna 520 to receive, from the reader device 590, programming information associated with implementing reporting rules at the sensor tag 500, and send sensed data to the reader device 590. The reader device 590 can be any device that can communicate with and collect sensed data and/or identifying information (e.g., barcode, electronic product code (EPC), tag ID, etc.) from the sensor tag 500. In some instances, the reader device 590 can be, for example, a RFID reader.

In some embodiments, data can be transmitted between the sensor tag 500 and the reader device 590 or other external device using any suitable wireless technology such as, for example, RF transmission, Bluetooth®, Wi-Fi, infrared, and/or the like. Alternatively or additionally, the sensor tag 500 may comprise a communication module 570 which may be connected to an external device (e.g., the reader device 590 or other device) for data transmission using a wired or other physical connection. For instance, communication module 570 may comprise or be interfaced with a connector (e.g., port, socket, etc.) that provides a physical interface for one or more of a USB connector, a serial connector, an I²C connector, a three-wire connector, a data port, etc. As an example, in such instances, the sensor tag 500 may receive programming information from a control device (e.g., the reader device 590, a computing device, a mobile communication device, etc.) using a wired connection via the connector of communication module 570, and send sensed data to the reader device 590 using a wireless connection via the antenna 520.

In some instances, the antenna 520 can be configured to collect energy from the reader device 590, and then provide the collected energy to the power converter 510. Using the provided energy, the power converter 510 can produce energy to drive each remaining component of the sensor tag 500. The sensor 540 can be any type of sensor configured to monitor the surrounding environment or the subject on which the wristband is used. The sensor 540 can be, for example, a temperature sensor that monitors a temperature of the surrounding environment, a motion sensor that monitors movement of a person on which the wristband is used, a vibration sensor that monitors a pulse of a patient on which the wristband is used, and/or the like. In some instances, the sensor 540 can be a SAW-based sensor similar to the sensor described with respect to FIG. 4. Although now shown in FIG. 5, in some instances, a sensor not included in the sensor tag 500 can be operatively connected to the sensor tag 500. For example, a SAW-based sensor implemented at a portion of the strap of the wristband can be connected to the sensor tag 500 using circuitry embedded within or attached to the strap. Data collected by such a SAW-based sensor can be sent from the SAW-based sensor to the sensor tag 500 using the circuitry.

The memory 580 can be, for example, a Random-Access Memory (RAM) (e.g., a dynamic RAM, a static RAM), a flash memory, a removable memory, and/or so forth. In some instances, instructions, data, and/or other information associated with performing the sensor operation and the operation of reporting sensed data can be stored within the memory 580 and executed at the processor 550. For example, programming instruction associated with defining a reporting rule can be stored in the memory 580. As another example, an implemented reporting rule can be stored in the memory 580. As yet another example, sensed data received from the sensor 540 can be stored in the memory 580 before being sent to the reader device 590 via the antenna 520.

The processor 550 includes a rule engine module 530. Although not shown in FIG. 5, in some instances, the processor 550 can include other modules such as, for example, a control module configured to control and drive the other components of the sensor tag 500, a communication module configured to control data transmission between the sensor tag 500 and the reader device 590, and/or the like. In some instances, the processor 550 can be connected to and receive data from the sensor 540 via a communication bus interface (not shown) associated with the processor 550. Each module in the processor 550 can be a hardware-based module (e.g., a field-programmable gate array (FPGA), an application specific integrated circuit (ASIC), a digital signal processor (DSP)), a software-based module (e.g., a module of computer code stored in the memory 580 and/or executed at the processor 550), and/or a combination of hardware- and software-based module. In some instances, the modules included and executed in the processor 550 can be, for example, a process, application, virtual machine, and/or some other hardware or software module (stored in memory and/or executing in hardware). The processor 550 can be any suitable processor configured to run and/or execute those modules.

In some instances, the rule engine module 530 can be programmed to define and/or implement one or more reporting rules associated with reporting sensed data to the reader device 590. Such a reporting rule can be defined to actively filter communication between the sensor tag 500 and the reader device 590 for the purpose of, for example, optimizing data throughput or improving efficiency of data exchange. For example, a reporting rule can be defined to report a sensed temperature only when the sensed temperature is above a certain threshold. As another example, a reporting rule can be defined to report a sensed pulse of a patient only when the sensed pulse of the patient has been maintained under a threshold for a certain period of time. Once the reporting rule(s) is implemented at the rule engine 530, the sensor tag 500 will report or exchange data with the reader device 590 only when the reporting rule(s) are met. In some instances, a sensor tag that implements a reporting rule in such a method can be referred to as a programmable active decision (PAD) sensor tag.

Figure 6:
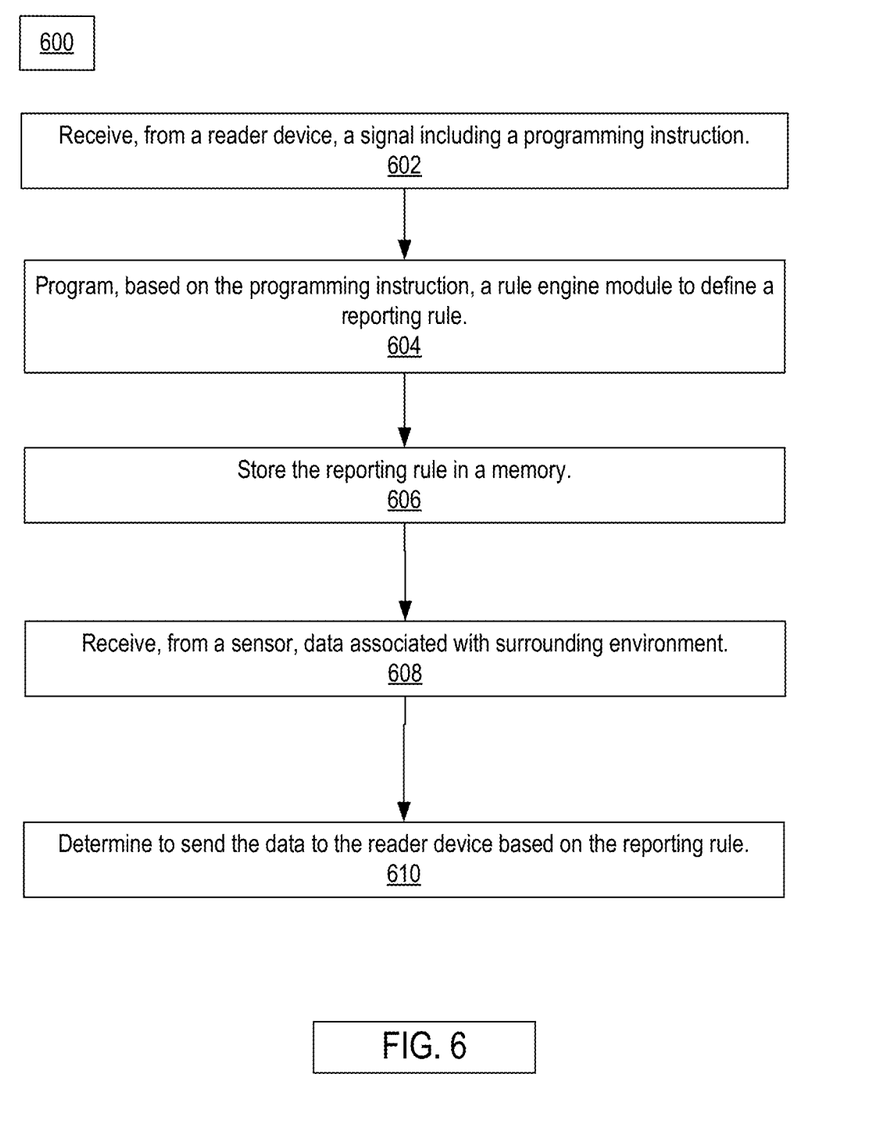
FIG. 6 is a flow chart illustrating a method for implementing a reporting rule at a sensor tag, according to an embodiment.

FIG. 6 is a flow chart illustrating a method 600 for implementing a reporting rule at a sensor tag, according to an embodiment. The sensor tag can be structurally and functionally similar to the sensor tag 500 shown and described with respect to FIG. 5. The code representing instructions to perform the method 600 can be stored in, for example, a non-transitory processor-readable medium (e.g., the memory 580 in FIG. 5) in the sensor tag, and executed at a processor (e.g., the processor 550 in FIG. 5) of the sensor tag. The code stored in the non-transitory processor-readable medium can include self-learning and/or self-healing code associated with performing the method 600 and/or other related operations. Particularly, the code stored in the non-transitory processor-readable medium includes code to be executed by the processor to cause the sensor tag to perform the operations illustrated in FIG. 6 and described as follows.

In embodiments which provide self-learning, data or reference values can be programmed into the processor (e.g., the processor 550 in FIG. 5). Values measured at the wristband (e.g., by a SAW sensor) can then be compared to these stored reference values to compute a difference or deviation. For example, if the tag is a blood sugar monitoring SAW tag, measured upper and/or lower blood glucose levels can be compared to healthy blood glucose levels learned for the patient. Furthermore, in embodiments which provide self-healing, the reference values to be used for comparison may be selected based on the temperature, since temperature variations can affect the applicable reference values. Advantageously, this provides more accurate, real-world results.

At 602, the sensor tag can receive a signal including a programming instruction from a reader device (e.g., the reader device 590 in FIG. 5). Such a programming instruction can be associated with implementing a reporting rule at the sensor tag. Particularly, such a programming instruction can be associated with programming in a rule engine module (e.g., the rule engine module 530 in FIG. 5) of the sensor tag, such that the rule engine module can define and execute the reporting rule. In some instances, a programming instruction can be a code or value that indicates to the rule engine module to implement a particular pre-defined rule. For example, a programming instruction can include a code that indicates to select a threshold from a set of pre-defined thresholds (e.g., 100° F. (Fahrenheit degree), 101° F., 102° F.) for reporting a body temperature of a patient. In other instances, a programming instruction can include information associated with defining a new reporting rule. For example, a programming instruction can include commands and/or data to instruct the rule engine module to define a new reporting rule that a body temperature of a patient be reported when the sensed body temperature increases 2° F. within five minutes.

At 604, the rule engine module can be programmed based on the programming instruction to define a reporting rule. As described with respect to FIG. 5, such a reporting rule can be used, for example, to filter data sent from the sensor tag to the reader device. As a result, the bandwidth requirement for data communications between a sensor tag and a reader device can be reduced, thereby allowing a reader device to communicate with and collect data from multiple sensor tags (e.g., by allowing each tag sufficient interference-free time to successfully communicate its information to the reader device) and/or allowing a sensor tag to communicate with (e.g., transmit data to) multiple reader devices. In addition, precious energy onboard the tags may be conserved, thereby extending the battery life of each tag. Additionally or alternatively, filtering can be performed at the reader device on data received from one or more tags. However, filtering data on the tags can optimize the entire communication chain from tag to reader to server.

At 606, the defined reporting rule can be stored in a memory (e.g., the memory 580 in FIG. 5) of the sensor tag. Alternatively, the defined reporting rule can be stored with the rule engine module or any other suitable location within the sensor tag. Furthermore, in some instances, the defined reporting rule can be modified, updated, or removed, based on, for example, a new programming instruction received at the sensor tag.

At 608, data associated with the surrounding environment can be received from a sensor (e.g., the sensor 540 in FIG. 5) associated with the sensor tag. As described with respect to FIG. 5, such a sensor can be included in or external to the sensor tag. At 610, the sensor tag can determine, in real time, whether to send the data to the reader device based on the reporting rule. Specifically, the sensor tag can determine to send the data to the reader device if the reporting rule is met by the data, or drop or not send the data if the reporting rule is not met. Subsequently, the data can be sent to the reader device or dropped accordingly.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. An apparatus comprising:
   a flexible strap comprising
      a plurality of holes,
      a strap buckle configured to buckle to at least one of the plurality of holes, such that, when the strap buckle is buckled to the at least one hole, the strap forms a closed loop, and
      a non-electrically-conductive material that electrically conductively separates a first electrically conductive portion of the strap, comprising a first one of the plurality of holes, from a second electrically conductive portion of the strap, comprising a second one of the plurality of holes; and a tag enclosure comprising
   a first buckle configured to buckle to the first hole,
   a second buckle configured to buckle to the second hole, and
   an electrically conductive material, such that, when the first buckle is buckled to the first hole of the first electrically conductive portion on a side of the non-electrically-conductive material and the second buckle is buckled to the second hole of the second electrically conductive portion on an opposite side of the non-electrically-conductive material, the electrically conductive material of the tag enclosure electrically conductively connects the first electrically conductive portion of the strap to the second electrically conductive portion of the strap across the non-electrically-conductive material of the flexible strap.

2. The apparatus of claim 1, wherein the first buckle is configured to, after having been buckled to the first hole, be unbuckled from the first hole.

3. The apparatus of claim 2, wherein the second buckle is configured to, after having been buckled to the second hole, be unbuckled from the second hole.

4. The apparatus of claim 1, wherein each of the first buckle and the second buckle are configured to buckle to any one of the first hole and the second hole.

5. The apparatus of claim 1, wherein the plurality of holes are identical.

6. The apparatus of claim 5, wherein the strap buckle, the first buckle of the tag enclosure, and the second buckle of the tag enclosure are identical.

7. The apparatus of claim 6, wherein each of the strap buckle, the first buckle of the tag enclosure, and the second buckle of the tag enclosure comprises:
   a buckle portion; and
   a folding portion comprising a target hole,
   wherein the folding portion is configured to fold around the strap, such that one of the plurality of holes in the strap is positioned between the buckle portion and the folding portion, and
   wherein the buckle portion is configured to be pressed through both the one hole in the strap, positioned between the buckle portion and the folding portion, and the target hole.

8. The apparatus of claim 1, wherein, when the strap forms the closed loop, the first electrically conductive portion is electrically conductively connected to the second electrically conductive portion via buckling of the strap buckle to the at least one hole, such that, when the first buckle of the tag enclosure is buckled to the first hole of the first electrically conductive portion and the second buckle of the tag enclosure is buckled to the second hole of the second electrically conductive portion, the strap and the tag enclosure form a closed circuit loop.

9. The apparatus of claim 8, wherein the strap buckle is electrically conductive and the at least one hole is formed in electrically conductive material of the strap, such that, buckling of the strap buckle to the at least one hole forms an electrically conductive contact.

10. The apparatus of claim 9, wherein the strap buckle is comprised in the first electrically conductive portion of the strap, and the at least one hole is comprised in the second electrically conductive portion of the strap.

11. The apparatus of claim 8, further comprising a circuit that is active when the strap and the tag enclosure form the closed circuit loop, and inactive when the strap and the tag enclosure do not form the closed circuit loop.

12. The apparatus of claim 11, further comprising a battery, wherein the tag enclosure comprises a radio-frequency identification (RFID) tag, wherein the circuit, when active, supplies energy from the battery to the RFID tag, and wherein the circuit, when inactive, does not supply energy from the battery to the RFID tag.

13. The apparatus of claim 12, wherein the RFID tag is configured to operate in a battery-assisted passive mode when supplied with energy from the battery, and operate in a pure passive mode when not supplied with energy from the battery.

14. The apparatus of claim 13, wherein the RFID tag is configured to receive an instruction, and, in response to the instruction, operate in the pure passive mode even when the closed circuit loop is formed.

15. The apparatus of claim 12, wherein the battery is a printed battery.

16. The apparatus of claim 11, wherein the tag enclosure comprises a radio-frequency identification (RFID) tag, wherein the circuit, when active, enables an antenna of the RFID tag to transmit data, and wherein the circuit, when inactive, disables the antenna of the RFID tag from transmitting data.

17. The apparatus of claim 11, further comprising a sensor, wherein the circuit, when active, enables the sensor to monitor an environmental characteristic, and wherein the circuit, when inactive, disables the sensor from monitoring the environmental characteristic.

18. The apparatus of claim 17, wherein the environmental characteristic comprises a temperature.

19. The apparatus of claim 17, wherein the environmental characteristic comprises a pulse of a person in contact with the sensor.

20. The apparatus of claim 17, wherein the environmental characteristic comprises a glucose level of a person wearing the apparatus.

* * * * *